United States Patent Office 3,337,351
Patented Aug. 22, 1967

3,337,351
ORGANOSILICON ANTI-FOGGING AGENTS
Edward L. Morehouse, Snyder, N.Y., assignor to Union Carbide Corporation, a corporation of New York
No Drawing. Filed Jan. 24, 1962, Ser. No. 168,520
3 Claims. (Cl. 106—13)

This invention relates to novel organosiloxane-oxyalkylene compositions useful as anti-fogging agents on solid surfaces.

When solid surfaces become relatively cool and are then exposed to warmer, moist atmospheres, there is a strong tendency for the cool surface to become fogged or frosted. This accumulation of fog or icy crystals on the surface may be objectionable for various reasons. If the surface is on a material which is intended to be transparent, such as an automobile windshield or spectacle lens, the fogging can become hazardous.

It is therefore a principal object of the present invention to provide an anti-fogging and anti-icing agent which can be readily applied to surfaces to prevent the formation of or removal of accumulations of fog or minor icing.

Compositions according to the present invention useful as an anti-fogging or anti-icing agent comprise solutions of an organosiloxane-oxyalkylene block copolymer in an aqueous or water-soluble organic liquid solvent. Preferably the block copolymer is dissolved in water or ethanol. Useful compositions include solutions containing from 0.00001 to 75 weight percent of the organosiloxane-oxyalkylene block copolymer based on total weight of the solution. Preferably the block copolymer is present in an amount from 0.0001 to 1 weight percent based on total weight of the solution.

The water-soluble organic liquid solvent useful in the anti-fogging solutions of the present invention is, for example, an alcohol, such as methanol, ethanol, propanol, butanol and the like; or a glycol, such as glycerol, ethylene glycol, propylene glycol and the like.

The block copolymer-solvent solution is applied to the desired portions of the solid surface by any convenient technique and then dried to form an adherent coating thereon. While not intending to be limited thereby, it is believed that the novel composition of the present invention acts as an anti-fogging agent by preventing the moisture from condensing on the solid surface in the form of individual particles (as a fog) and allowing the moisture to condense as a clear surface film which is transparent.

The organosiloxane-oxyalkylene copolymers useful in the compositions of this invention are of the class that are known as "block" copolymers. Block copolymers are composed of at least two sections or blocks at least one section or block composed of one type of recurring units or groups (e.g., siloxane groups as in the copolymers useful in this invention) and at least one other section or block composed of a different type of recurring units or groups (e.g., oxyalkylene groups as in the copolymers useful in this invention). Block copolymers can have linear, cyclic, branched or crosslinked structures.

The siloxane blocks in the copolymers employed in the compositions of this invention contain at least two siloxane groups that are represented by the formula (1)  $R_bSiO_{4-b/2}$ wherein R is a monovalent hydrocarbon group, a halogen-substituted monovalent hydrocarbon group or a divalent hydrocarbon group and $b$ has a value from 1 to 3. Preferably, each R contains from one to about twenty carbon atoms. The groups represented by R can be the same or different in any given siloxane group or throughout the siloxane block, and the value of $b$ in the various siloxane groups in the siloxane block can be the same or different. The divalent hydrocarbon groups represented by R link the siloxane block to the oxyalkylene block. Each siloxane block contains at least one group represented by Formula 1 wherein at least one group represented by R is a divalent hydrocarbon group. The siloxane block has a ratio of hydrocarbon groups to silicon atoms from 1:1 to 3:1.

Illustrative of the monovalent hydrocarbon groups that are represented by the R in Formula 1 are the alkenyl groups (for example, the vinyl group and the allyl group); the cycloalkenyl groups (for example, the cyclohexenyl group); the alkyl groups (for example, the methyl, ethyl, isopropyl, octyl, dodecyl, octadecyl and eicosyl groups); the aryl groups (for example, the phenyl, naphthyl, and terphenyl groups); the aralkyl groups (for example, the benzyl and the phenylethyl groups); the alkaryl groups such as, the styryl, tolyl and n-hexylphenyl groups, and the cycloalkyl groups (for example, the cyclohexyl group).

Illustrative of the halogen-substituted monovalent hydrocarbon groups that are represented by R in Formula 1 are the chloromethyl, trichloroethyl, perfluorovinyl, parabromobenzyl, iodophenyl, alpha-chloro-beta-phenylethyl, parachlorotolyl, and bromocyclohexyl groups and the like.

Illustrative of the divalent hydrocarbon groups represented by R in Formula 1 are the alkylene groups (such as, the methylene, ethylene, propylene, butylene, 2,2-dimethyl-1,3-propylene, decylene and eicosylene groups), the arylene groups (such as the phenylene and p,p'-diphenylene groups), and the alkarylene groups (such as, the phenylethylene group). Preferably, the divalent hydrocarbon group is an alkylene group containing from two to four successive carbon atoms. Siloxane groups containing divalent groups as substituents are illustrated by groups having the formulas:

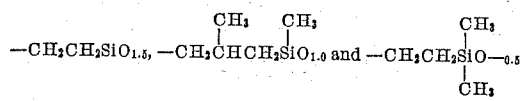

These divalent hydrocarbon groups are linked to a silicon atom of the siloxane block by a silicon-to-carbon bond and to an oxygen atom of the oxyalkylene block by a carbon-to-oxygen bond.

The siloxane block can contain siloxane groups that are represented by Formula 1 wherein either the same hydrocarbon groups are attached to the silicon atoms (e.g., the dimethylsiloxy, diphenylsiloxy and diethylsiloxy groups) or different hydrocarbon groups are attached to the silicon atoms (e.g., the methylphenylsiloxy, phenylethylmethylsiloxy and ethylvinylsiloxy groups).

The siloxane block in the copolymers useful in the compositions of this invention can contain one or more types of siloxanes groups that are represented by Formula 1 provided that at least one group has at least one divalent hydrocarbon substituent. By way of illustration, only ethylenemethylsiloxy groups,

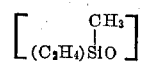

can be present in the siloxane block or the siloxane block can contain more than one type of siloxane group, e.g., the block can contain both ethylenemethylsiloxy groups and diphenylsiloxy groups, or the block can contain ethylenemethylsiloxy groups, diphenylsiloxy groups and diethylsiloxy groups.

The siloxane block contained in the copolymers useful in the compositions of this invention can contain trifunctional siloxane groups (e.g., monomethylsiloxane groups, $CH_3SiO_{1.5}$), difunctional siloxane groups (e.g., dimethylsiloxane groups, $(CH_3)_2SiO$—), monofunctional siloxane groups (e.g., trimethylsiloxane groups, $$(CH_3)_3SiO_{0.5}$$

or combinations of these types of siloxane groups having the same or different substituents. Due to the functionality of the siloxane groups, the siloxane block can be predominantly linear or cyclic or branched or it can have combinations of these structures.

The siloxane block contained in the copolymers useful in the compositions of this invention can contain organic end-blocking or chain terminating organic groups as well as the monofunctional siloxane chain terminating groups encompassed by Formula 1. By way of illustration, the siloxane block can contain such organic end-blocking groups as the hydroxyl group, the aryloxy groups (such as, the phenoxy group), the alkoxy groups (such as, the methoxy, ethoxy, propoxy and butoxy groups), the acyloxy groups (such as the acetoxy group), and the like.

The siloxane blocks in the copolymers useful in the compositions of this invention contain at least two siloxane groups that are represented by Formula 1. Preferably, the siloxane blocks contain a total of at least five siloxane groups that are represented by Formula 1 and by Formula 1-a below. That part of the average molecular weight of the copolymer that is attributable to the siloxane blocks can be as high as 50,000 or greater.

A siloxane block can contain, in addition to the groups represented by Formula 1, one or more siloxane groups represented by the formula:

(1-a)

wherein R has the meaning defined in Formula 1, $e$ has a value from 0 to 2, $f$ has a value from 1 to 2 and $e+f$ has a value from 1 to 3.

The oxyalkylene blocks in the copolymers employed in the compositions of this invention each contain at least four oxyalkylene groups that are represented by the formula:

(2) $\quad [-R'O-]$ wherein R' is a alkylene group. Preferably, the alkylene group represented by R' in Formula 2 contains from two to about ten carbon atoms, and most preferably from two to three carbon atoms. Water-solubility of the copolymer is enhanced when R' contains less than three carbon atoms. It is therefore important that at least one $-C_2H_4O-$ group be present in the copolymer for it to be at least partially water-soluble. Illustrative of the oxyalkylene groups that are represented by Formula 2 are the oxyethylene, oxy-1,2-propylene, oxy-1,3-propylene, oxy-2,2-dimethyl-1,3-propylene, oxy-1,10-decylene groups, and the like.

The oxyalkylene blocks in the copolymers useful in the compositions of this invention can contain one or more of the various types of oxyalkylene groups represented by Formula 2. By way of illustration, the oxyalkylene blocks can contain only oxyethylene groups or only oxypropylene groups or both oxyethylene and oxypropylene groups, or other combinations of the various types of oxyalkylene groups represented by Formula 2.

The oxyalkylene blocks in the copolymers useful in the compositions of this invention can contain organic end-blocking or chain terminating groups. By way of illustration, the oxyalkylene blocks can contain such end-blocking groups as the hydroxy group, the aryloxy group (such as, the phenoxy group), the alkoxy groups (such as, the methoxy, ethoxy, propoxy and butoxy groups), alkenyloxy groups (such as, the vinyloxy and the allyloxy groups). Also, single group can serve as an end-blocking group for more than one oxylalkylene block. For example, the glyceroxy group,

can serve as an end-blocking group for three oxyalkylene chains.

The oxyalkylene blocks in the copolymers useful in the compositions of this invention each contain at least four oxyalkylene groups that are represented by Formula 2. Preferably, each block contains at least five of such groups. That part of the average molecular weight of the copolymer that is attributable to the oxyalkylene blocks can vary from 176 for $(C_2H_4O)_4$ to 50,000 or greater.

The block copolymers useful in the compositions of this invention can contain siloxane blocks and oxyalkylene blocks in any relative amount. In order to possess desirable properties, the copolymer should contain from 5 parts by weight to 95 parts by weight of siloxane blocks and from 5 parts by weight to 95 parts by weight of oxyalkylene blocks per 100 parts by weight of the copolymer. Preferably, the copolymers contain 5 parts by weight to 50 parts by weight of the siloxane blocks and from 50 parts by weight to 95 parts by weight of the oxyalkylene blocks per 100 parts by weight of the copolymer.

The block copolymers useful in the compositions of this invention can contain more than one of each of the blocks and the blocks can be arranged in various configurations such as, linear, cyclic or branched configurations, By way of illustration, the following classes of compounds are among the siloxane-oxyalkylene block copolymers useful in the formulations of this invention:

(A) Copolymers that contain at least one unit that is represented by the formula:

(3)
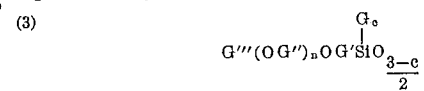

(B) Copolymers that contain at least one unit that is represented by the formula:

(4)
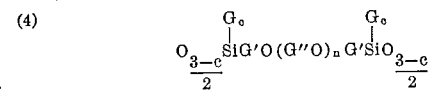

(C) Copolymers that contain at least one unit that is represented by the formula:

(5)
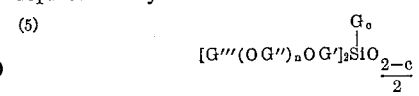

In the above Formulas 3, 4 and 5, G is a monovalent hydrocarbon radical or a halogen-substituted monovalent hydrocarbon radical, G' is a divalent hydrocarbon radical, G'' is an alkylene radical containing at least two carbon atoms, G''' is a hydrogen atom or a monovalent hydrocarbon radical free of aliphatic unsaturation, $n$ is an integer having a value of at least four, and $c$ has a value from 0 to 2 in Formulas 3 and 4 and 0 to 1 in Formula 5. In Formulas 3, 4 and 5, G can represent the same or different radicals, $n$ preferably has a value from 4 to 30 and G'' can represent the same or different radicals, i.e., the group $(OG'')_n$ can represent, for example, the groups: $-(OC_2H_4)_p-$, $-(OC_2H_4)_p(OC_3H_6)_q-$, $-(OC_3H_6)_p-$ or $-(OC_2H_4)_p(OC_8H_{16})_q-$, where $p$ and $q$ are integers having a value of at least one.

The monovalent hydrocarbon radicals and halogen-substituted monovalent hydrocarbon radicals represented by G in Formulas 3, 4 and 5 can be saturated or olefinically unsaturated or can contain benzenoid unsaturation. Illustrative of the monovalent hydrocarbon radicals represented by G are the linear aliphatic radicals (e.g., the methyl, ethyl, decyl, octadecyl and eicosyl radicals), the cycloaliphatic radicals (e.g., the cyclohexyl and the cyclopentyl radicals), the aryl radicals (e.g., the phenyl, tolyl, xylyl, naphthyl and terphenyl radicals), the aralkyl radicals (e.g., the benzyl and betaphenylethyl radicals), the unsaturated linear aliphatic radicals (e.g., the vinyl, allyl and hexenyl radicals) and the unsaturated cycloaliphatic radicals (e.g., the cyclohexenyl radical).

Illustrative of the halogen-substituted monovalent hydrocarbon radicals represented by G are the chloromethyl, trichloroethyl, perfluorovinyl, para-bromobenzyl, iodophenyl, alpha-chloro-beta-phenylethyl, para-chlorotolyl and bromocyclohexyl groups and the like.

Preferably, the G and G' groups (included in the definition of R in Formulas 1 and 1-a above) contain from one to about twenty carbon atoms and the G'' groups (included in the definition of R' in Formula 2 above) contain from two to about ten carbon atoms. When the G''' group is a monovalent hydrocarbon radical free of aliphatic unsaturation it preferably contains from one to about twelve carbon atoms.

Illustrative of the divalent hydrocarbon radicals represented by G' in Formulas 3, 4 and 5 are the alkylene radicals (e.g., the methylene, ethylene, 1,3-propylene, 1,4-butylene, 1,12-dodecylene and 1,20-eicosylene radicals), the arylene radicals (e.g., the phenylene radical) and the ararylene radicals (e.g., the phenylethylene radicals). In Formulas 3, 4 and 5, G' is preferably an alkylene radical containing at least two carbon atoms.

Illustrative of the alkylene radicals containing at least two carbon atoms represented by G'' in Formulas 3, 4 and 5 are the ethylene, 1,2-propylene, 1,3-propylene, 1,6-hexylene, 2-ethylhexylene-1,6 and 1,12-dodecylene radicals.

Illustrative of the radicals represented by G''' in Formulas 3, 4 and 5 are the saturated linear or branched chain aliphatic hydrocarbon radicals (e.g., the methyl, ethyl, propyl, n-butyl, tert.-butyl and decyl radicals), the saturated cycloaliphatic hydrocarbon radicals (e.g., the cyclopentyl and cyclohexyl radical), the aryl hydrocarbon radicals (e.g., the phenyl, tolyl, naphthyl and xylyl radicals), and the aralkyl hydrocarbon radicals (e.g., the benzyl and betaphenylethyl radicals).

The following are representative of the hydrolytically stable siloxane-oxyalkylene block copolymers useful in the compositions of this invention. In the formulas, Me represents methyl ($CH_3$), Et represents ethyl $$(CH_3CH_2)$$

φ represents phenyl ($C_6H_5$), Bu represents n-butyl $$(CH_3CH_2CH_2CH_2)$$

and x is an integer. Where the formula represents a unit of a polymer, it is understood that the polymer is terminated by end-blocking groups of the type described hereinabove.

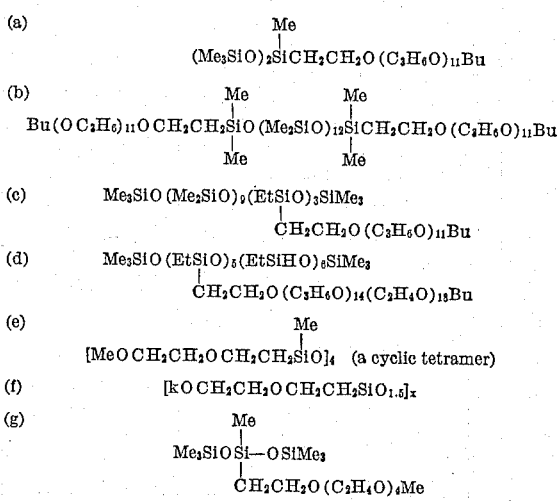

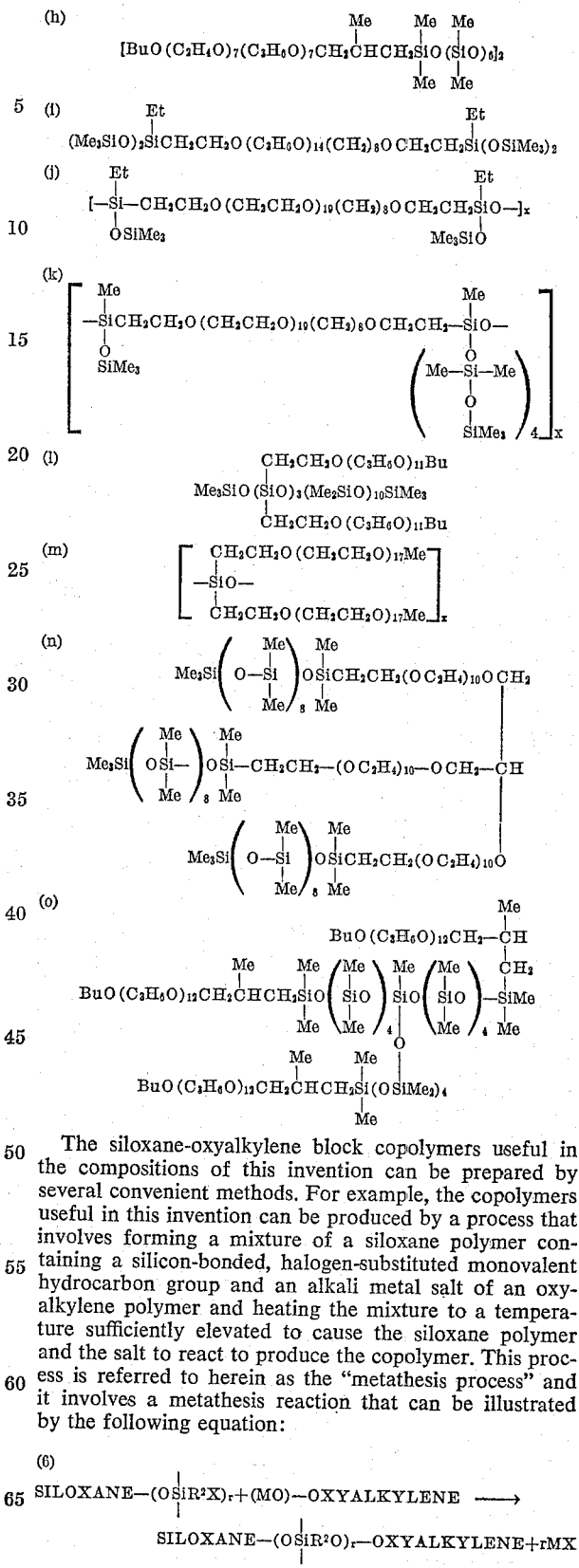

The siloxane-oxyalkylene block copolymers useful in the compositions of this invention can be prepared by several convenient methods. For example, the copolymers useful in this invention can be produced by a process that involves forming a mixture of a siloxane polymer containing a silicon-bonded, halogen-substituted monovalent hydrocarbon group and an alkali metal salt of an oxyalkylene polymer and heating the mixture to a temperature sufficiently elevated to cause the siloxane polymer and the salt to react to produce the copolymer. This process is referred to herein as the "metathesis process" and it involves a metathesis reaction that can be illustrated by the following equation:

(6)

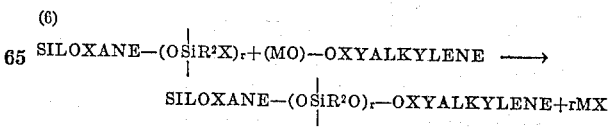

wherein $R^2$ is a divalent hydrocarbon group, r is an integer that has a value of at least 1 and preferably 1 to about 4, X is a halogen atom, M is an alkali metal, SILOXANE denotes a siloxane block and OXYALKYLENE denotes an oxyalkylene block.

The copolymers useful in this invention can also be produced by another process (termed the "addition process") that involves forming a mixture of a siloxane polymer containing a hydrogen-siloxy group (i.e., a

group), an oxyalkylene polymer containing an alkenyloxy end-blocking or chain terminating group and a platinum catalyst and heating the mixture to a temperature sufficiently elevated to cause the siloxane polymer and the oxyalkylene polymer to react to produce the copolymer. The latter-mentioned reaction is an addition reaction that can be illustrated by the following equation:

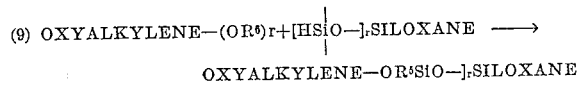

wherein OXYALKYLENE, SILOXANE and $r$ have the meaning defined for Formula 6, $OR^6$ is an alkenyloxy group (such as, the vinyloxy and the allyloxy groups) and $R^5$ is an alkylene group containing at least two successive carbon atoms. The addition process is applicable to the production of those copolymers of this invention containing a siloxane block that is linked to an oxyalkylene block by an alkylene group that has at least two successive carbon atoms (e.g., an ethylene, 1,2-propylene or 1,2-butylene group and the like).

When the polysiloxane-oxyalkylene block copolymer contains silicon-bonded hydrogen atoms, i.e., contains units represented by Formula 1–$a$ described above, the addition process is preferable. If the metathesis process is used, many of the silicon-bonded hydrogen atoms will react with the alkali metal ions present in the reaction mixture.

When the copolymers useful in this invention contain olefinically unsaturated groups attached to silicon (for example, when R in Formula 1 or 1–$a$ above is alkenyl or cycloalkenyl, such as vinyl or cyclohexenyl) it is preferable to prepare these copolymers by addition of the alkenyloxy-end-blocked oxyalkylene polymer to a monomeric, hydrolyzable silane containing silicon-bonded hydrogen, followed by cohydrolysis or co-condensation with other hydrolyzable silanes containing silicon-bonded hydrogen and silicon-bonded olefinically unsaturated hydrocarbon groups using conventional techniques known to those versed in the art. For example, reaction of $$CH_2=CHCH_2(OC_2H_4)_6OCH_3$$

with $CH_3SiHCl_2$ in the presence of a platinum catalyst followed by cohydrolysis of the product with $$CH_2=CHSi(CH_3)Cl_2$$

$CH_3SiHCl_2$, and $(CH_3)_3SiCl$ gives a copolymer useful in this invention containing units having the formulas $$CH_3O(C_2H_4O)_6CH_2CH_2CH_2Si(CH_3)O$$

$CH_2=CHSi(CH_3)O$ and $CH_3SiHO$, end-blocked with $(CH_3)_3SiO$ groups.

Organosiloxane-oxyalkylene block copolymers which are especially useful in compositions of the present invention have the following formulas:

($p$) 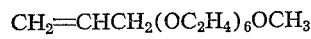

Molecular weight of about 3600

($q$) 
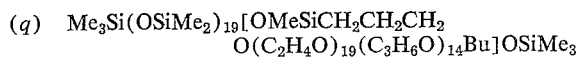

Molecular weight of about 7000

($r$) 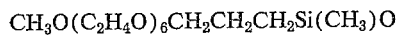

Molecular weight of about 3100

The following examples describe utility of an organosiloxane-oxyalkylene block copolymer as an anti-fogging and anti-icing agent for solid surfaces.

Example 1

About 40 grams of solution were prepared in a 50 cc. beaker by mixing 4 grams of an organosiloxane-oxyalkylene block copolymer having the average formula shown in Formula $q$ above and 36 grams of water. A glass slide was partially immersed in this test solution, dried at room temperature and then placed outside at an ambient temperature of about 5–10° F. for several minutes. The cold slide was then brought into a warm room and evaluated by blowing on it. The treated portion of the slide remained clear while the untreated portion of the glass fogged severely.

Similar results were obtained with a solution of ethanol and the same organosiloxane-oxyalkylene block copolymer.

The anti-fogging solution can be modified with a low freezing point material, such as ethylene glycol, and also by adding other oxyalkylene materials. This is shown in the following examples.

Example 2

About 40 grams of solution were prepared in a 50 cc. beaker by mixing 0.4 gram of an organosiloxane-oxyalkylene block copolymer having the average formula shown in Formula $q$ above, 1.6 grams of a butoxy-end-blocked ethylene oxide-propylene oxide polymer having an average formula of $C_4H_9O(C_2H_4O)_{2.1}(C_3H_6O)_{1.6}H$, and 38 grams of ethanol. A glass slide was treated in a manner similar to that described in Example 1 above. The organosiloxane-oxyalkylene solution acted as an excellent anti-fogging agent.

Example 3

About 40 grams of solution were prepared in a 50 cc. beaker by mixing 0.2 gram of an organosiloxane-oxyalkylene block copolymer having the average formula shown in Formula $q$ above, 0.8 gram of a butoxy end-blocked ethylene oxide-propylene oxide polymer having an average formula of $C_4H_9O(C_2H_4O)_{2.1}(C_3H_6O)_{1.6}H$, 0.6 gram of ethylene glycol and 38 grams of ethanol. A glass slide was treated in a manner similar to that described in Example 1 above. The solution acted as an excellent anti-fogging agent.

Ethylene glycol alone or ethylene glycol-ethanol solutions have poor anti-fogging results when subjected to the above described test.

Example 4

Portions of the solution described in Example 2 above were applied with a cloth to the icy-frosted inside surface of a cold automobile window to give a clear even film. The glass in the treated portion cleared immediately and remained clear for about 5 minutes and then began to frost over again. The automobile heater was then turned on and the treated portion rapidly cleared again and remained clear. The untreated portions of the frosted glass remained cloudy and frosted at all times during the test. This demonstrates the desirable anti-icing properties of the organosiloxane-oxyalkylene block copolymer solution.

Water and alcohol solutions of organosiloxane-oxyalkylene block copolymers having the average formula of Formula $p$ above have also been shown to have good anti-fog properties when applied to solid plastic surfaces, such as polystyrene films.

What is claimed is:

1. A composition suitable for use as an anti-fog agent when applied to solid surfaces which comprises (1) from 0.001 to 1 weight percent based on the total weight of the composition of an organosiloxane-oxyalkylene block copolymer comprising (a) at least one siloxane block containing at least two siloxane units represented by the formula:

$$R_bSiO_{4-b/2}$$

wherein R contains from one to about twenty carbon atoms and is selected from the class consisting of monovalent hydrocarbon groups, halogen-substituted monovalent hydrocarbon groups, and divalent hydrocarbon groups and *b* has a value from 1 to 3 inclusive, said siloxane block containing at least one of said siloxane units wherein at least one R group is a divalent hydrocarbon group, and (b) at least one oxyalkylene block containing at least four oxyalkylene groups represented by the formula —R'O—, wherein R' is an alkylene group containing from two to about ten carbon atoms, said siloxane oxyalkylene blocks being interconnected by said divalent hydrocarbon group, and (2) a mixture of ethanol and ethylene glycol as a solvent.

2. A process of rendering a body having a surface composed of a material selected from the group consisting of glass and normally transparent solid plastics resistant to fogging on its surface which comprises applying to at least a portion of the surface of said body a solution which comprises (1) from 0.001 to 75 weight percent based on the total weight of the solution of an organosiloxane-oxyalkylene block copolymer comprising (a) at least one siloxane block containing at least two siloxane units represented by the formula:

$$R_bSiO_{4-b/2}$$

wherein R contains from one to about twenty carbon atoms and is selected from the class consisting of monovalent hydrocarbon groups, halogen-substituted monovalent hydrocarbon groups and divalent hydrocarbon groups and *b* has a value from 1 to 3 inclusive, said siloxane block containing at least one of said siloxane units wherein at least one R group is a divalent hydrocarbon group, and (b) at least one oxyalkylene block containing at least four oxyalkylene groups represented by the formula —R'O—, wherein R' is an alkylene group containing from two to about ten carbon atoms, said siloxane and oxyalkylene blocks being interconnected by said divalent hydrocarbon group, and (2) a solvent selected from the class consisting of water and water-soluble organic liquids, and then drying the applied solution to form an adherent, anti-fogging coating on the surface of the body.

3. An article having a surface selected from the group consisting of glass and normally transparent solid plastic materials coated with a film of an organosiloxane-oxyalkylene block copolymer comprising (a) at least one siloxane block containing at least two siloxane units represented by the formula:

$$R_bSiO_{4-b/2}$$

wherein R contains from one to about twenty carbon atoms and is selected from the class consisting of monovalent hydrocarbon groups, halogen-substituted monovalent hydrocarbon groups, and divalent hydrocarbon groups and *b* has a value from 1 to 3 inclusive, said siloxane block containing at least one of said siloxane units wherein at least one R group is a divalent hydrocarbon group, and (b) at least one oxyalkylene block containing at least four oxyalkylene groups represented by the formula —R'O—, wherein R' is an alkylene group containing from two to about ten carbon atoms, said siloxane and oxyalkylene blocks being interconnected by said divalent hydrocarbon group, said coating rendering said surface resistant to fogging.

References Cited

UNITED STATES PATENTS

| | | | |
|---|---|---|---|
| 2,470,772 | 5/1949 | Haas | 106—287 |
| 2,846,458 | 8/1958 | Haluska | 260—449.2 |
| 2,868,824 | 1/1959 | Haluska | 260—448.2 |
| 2,877,201 | 3/1959 | Bonza et al. | 106—287 |

D. J. ARNOLD, *Primary Examiner.*

MORRIS LIEBMAN, ALEXANDER H. BRODMERKEL, *Examiners.*

J. E. CARSON, L. B. HAYES, *Assistant Examiners.*

UNITED STATES PATENT OFFICE
CERTIFICATE OF CORRECTION

Patent No. 3,337,351                  August 22, 1967

Edward L. Morehouse

It is hereby certified that error appears in the above numbered patent requiring correction and that the said Letters Patent should read as corrected below.

Column 1, line 65, column 9, lines 3 and 29, and column 10, line 12, the formula, each occurrence, should appear as shown below instead of as in the patent:

$$R_b SiO_{\frac{4-b}{2}}$$

Signed and sealed this 7th day of January 1969.

(SEAL)
Attest:

Edward M. Fletcher, Jr.
Attesting Officer

EDWARD J. BRENNER
Commissioner of Patents